United States Patent [19]
Fujimori

[11] Patent Number: 6,007,205
[45] Date of Patent: Dec. 28, 1999

[54] OPTICAL LENS UNIT HAVING INTERNALIZED FAN UNIT AND PROJECTION APPARATUS HOUSING THE SAME

[75] Inventor: Motoyuki Fujimori, Suwa, Japan

[73] Assignee: Seiko Epson Corporation, Tokyo, Japan

[21] Appl. No.: 08/737,957

[22] PCT Filed: Mar. 27, 1996

[86] PCT No.: PCT/JP96/00794

§ 371 Date: Feb. 21, 1997

§ 102(e) Date: Feb. 21, 1997

[87] PCT Pub. No.: WO96/30805

PCT Pub. Date: Oct. 3, 1996

[30] Foreign Application Priority Data

Mar. 30, 1995 [JP] Japan .................................. 7-99777

[51] Int. Cl.⁶ ............................................ G03B 21/16
[52] U.S. Cl. ................................... 353/57; 353/60
[58] Field of Search ............................ 353/52, 57, 60, 353/61, 119, 56, 58; 359/820

[56] References Cited

U.S. PATENT DOCUMENTS

| | | | |
|---|---|---|---|
| 3,187,173 | 6/1965 | Foley | 353/57 |
| 3,748,033 | 7/1973 | Harvey | 353/60 |
| 4,787,737 | 11/1988 | Ogawa et al. | 353/57 |
| 5,170,195 | 12/1992 | Akiyama et al. | 353/52 |
| 5,287,132 | 2/1994 | Suzuki et al. | 353/57 |
| 5,418,586 | 5/1995 | Fujimori et al. | 353/58 |
| 5,651,599 | 7/1997 | Fujimori et al. | 353/119 |
| 5,692,821 | 12/1997 | Rodriguez, Jr. et al. | 353/52 |
| 5,738,427 | 4/1998 | Booth et al. | 353/60 |
| 5,772,300 | 6/1998 | Kitai | 353/60 |
| 5,803,566 | 9/1998 | Ogino | 353/52 |

FOREIGN PATENT DOCUMENTS

| | | |
|---|---|---|
| 1-302387 | 12/1989 | Japan . |
| 4-55489 | 9/1992 | Japan . |
| 6-2337 | 1/1994 | Japan . |
| 6-3644 | 1/1994 | Japan . |

Primary Examiner—William C. Dowling
Attorney, Agent, or Firm—Michael T. Gabrik

[57] ABSTRACT

The internal space of the optical lens unit (9) of the projection display apparatus (1) 1 is made substantially airtight by means of the light guides (901, 902) defining the outside surface thereof, the top seal plate (991) mounted to the top thereof, the bottom seal plate (1150) mounted to the bottom thereof, and the front head panel (903) thereof. Inside this internal space an air circulation current (1180) circulating vertically is created by means of the circulation fan (15B) disposed between the liquid crystal light valves (925R, G, B) and bottom seal plate (1150). While this air circulation current (1180) flows over the bottom of the top seal plate (991), heat is dissipated to the outside air introduced to the top surface thereof, and while it passes the air paths (1160, 1170) routed through the vent hole in head panel (903) over the radiators (5R and 5L) formed in the front case, heat is dissipated to the outside. The internal components are efficiently cooled by means of the sufficiently cooled air circulation current (1180). Because this is also a circulating air current, dust, etc., does not penetrate inside the apparatus.

20 Claims, 11 Drawing Sheets

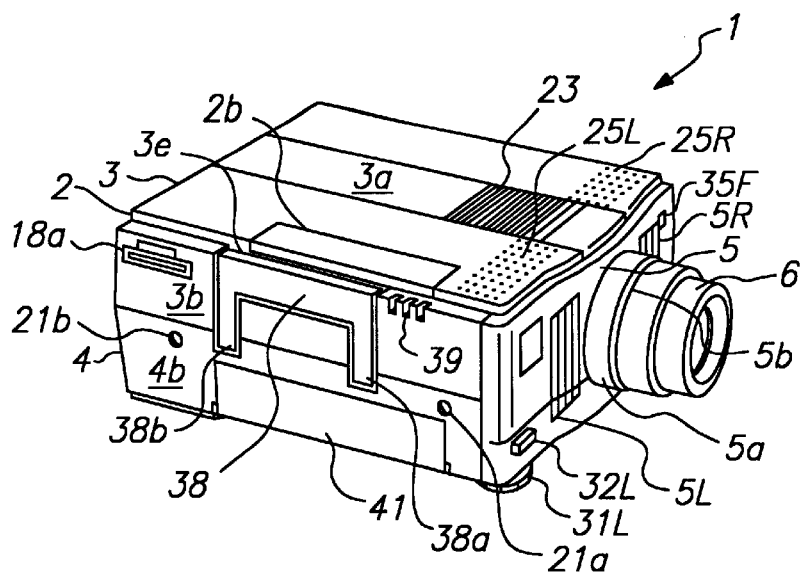
FIG._1A
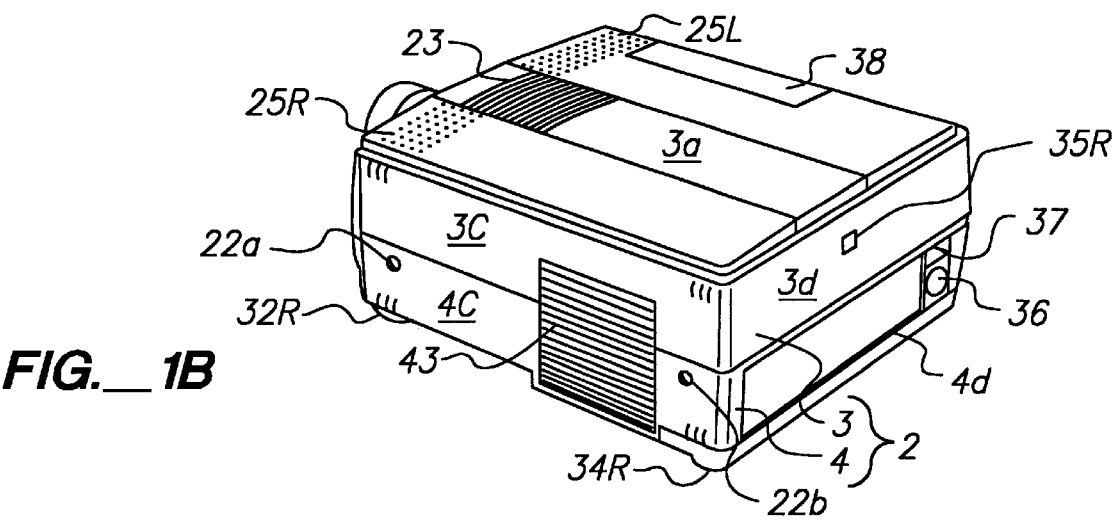
FIG._1B
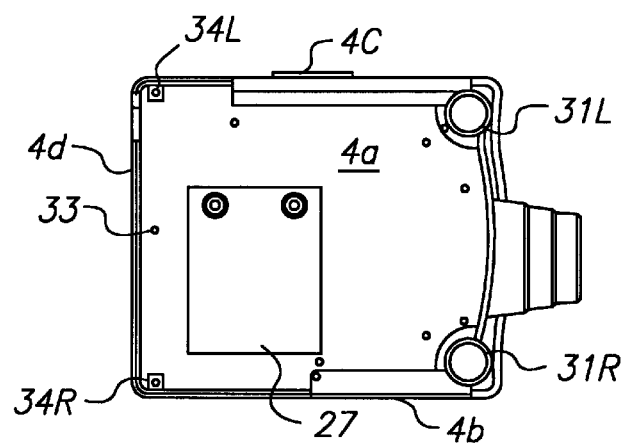
FIG._1C

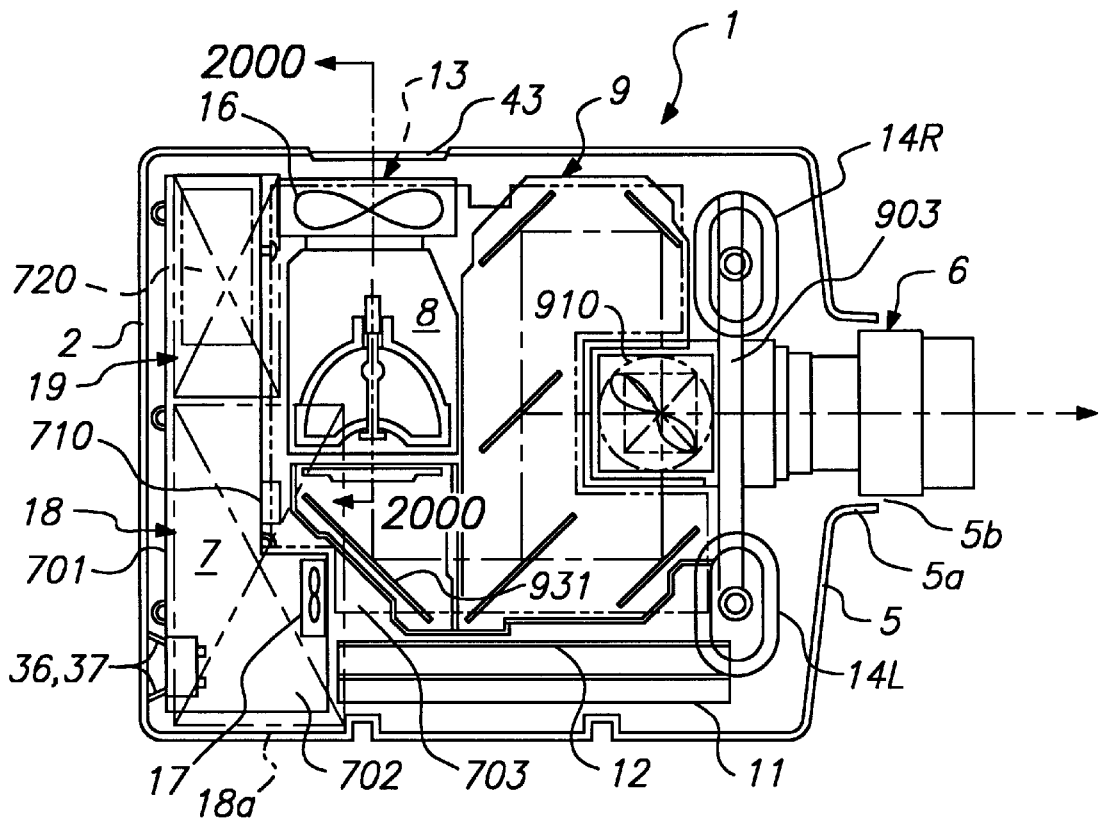
FIG._2A
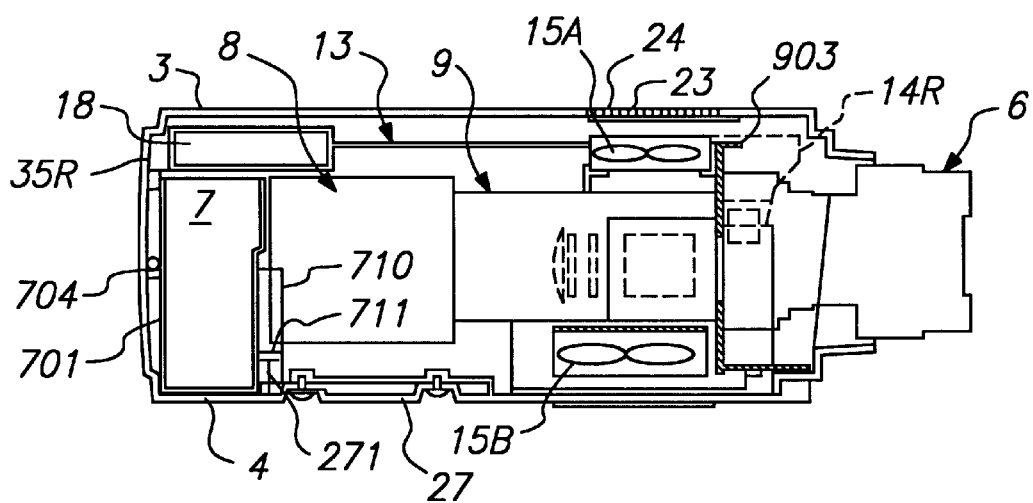
FIG._2B

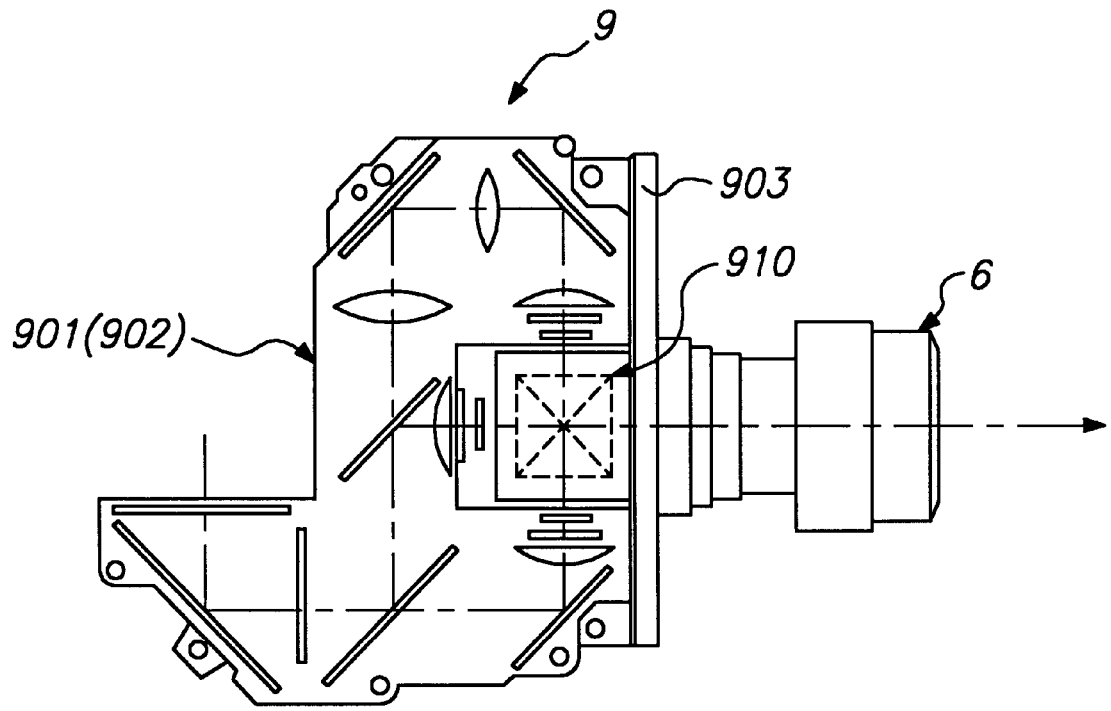
FIG._3A
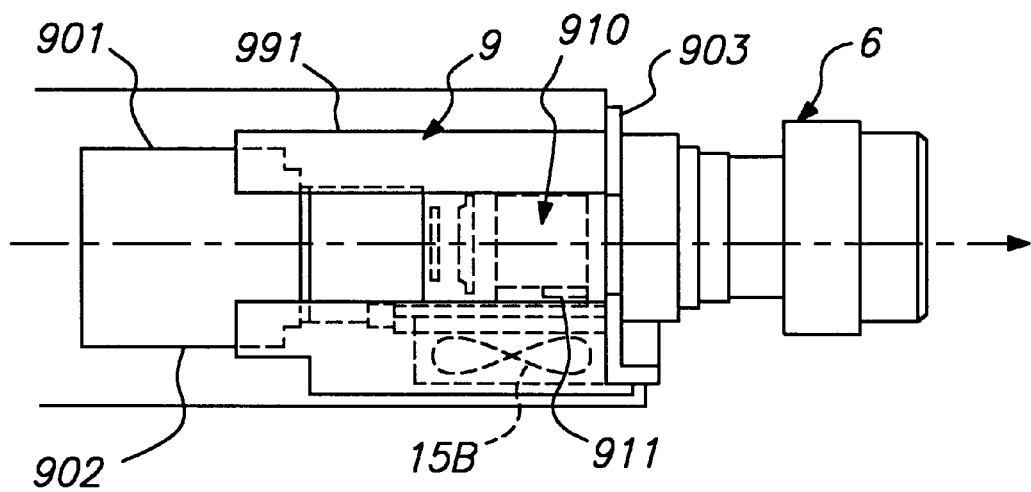
FIG._3B

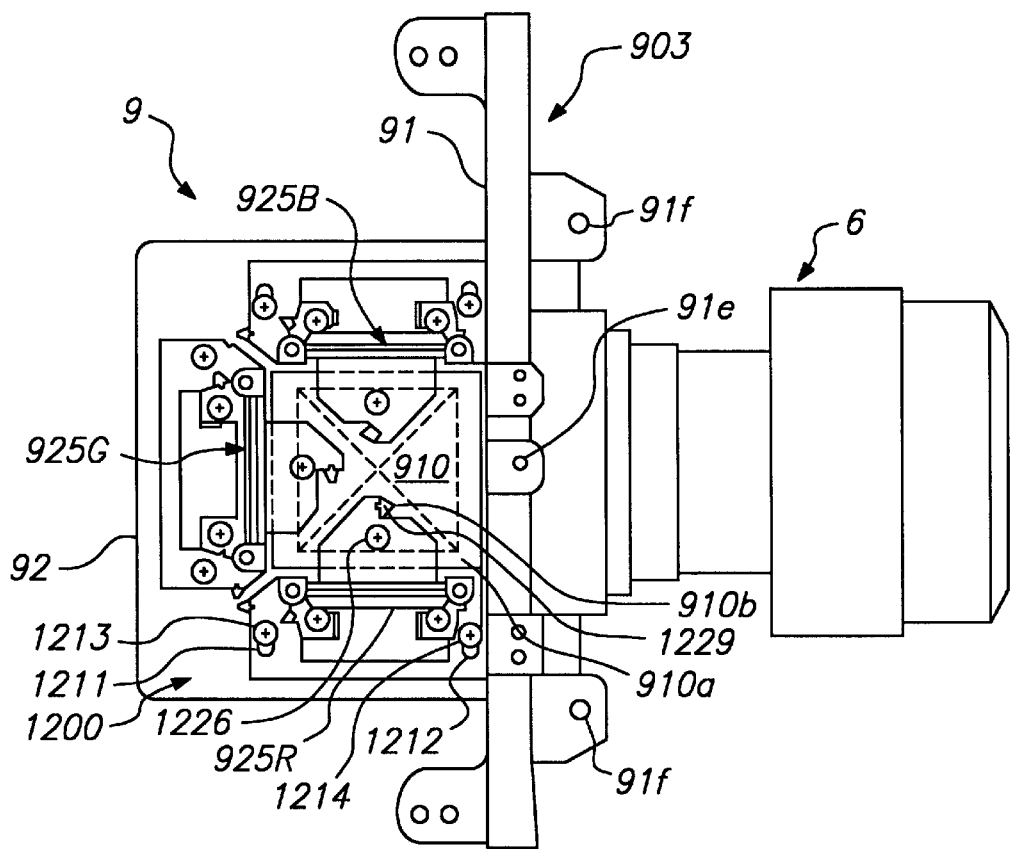
FIG._4A
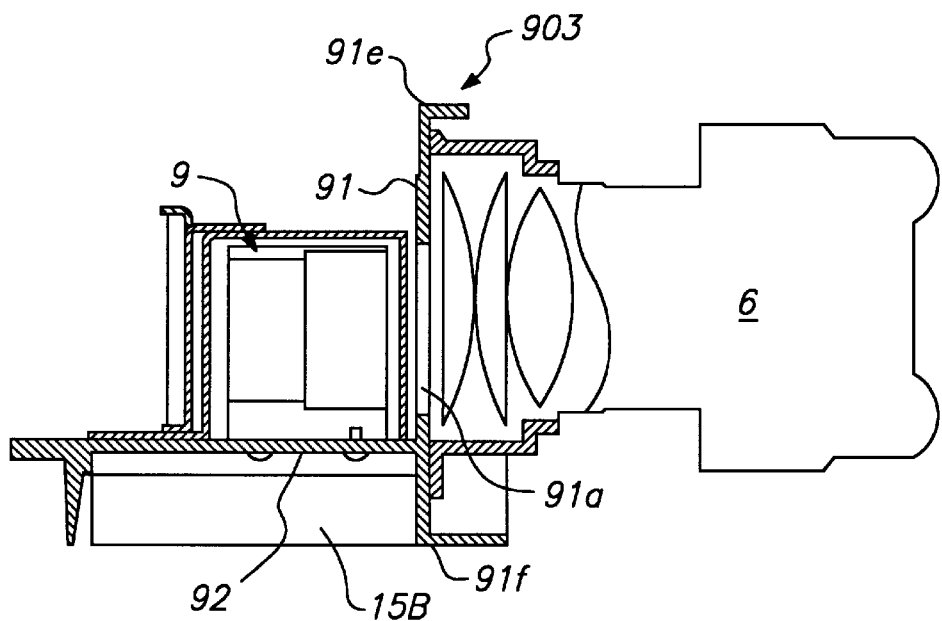
FIG._4B

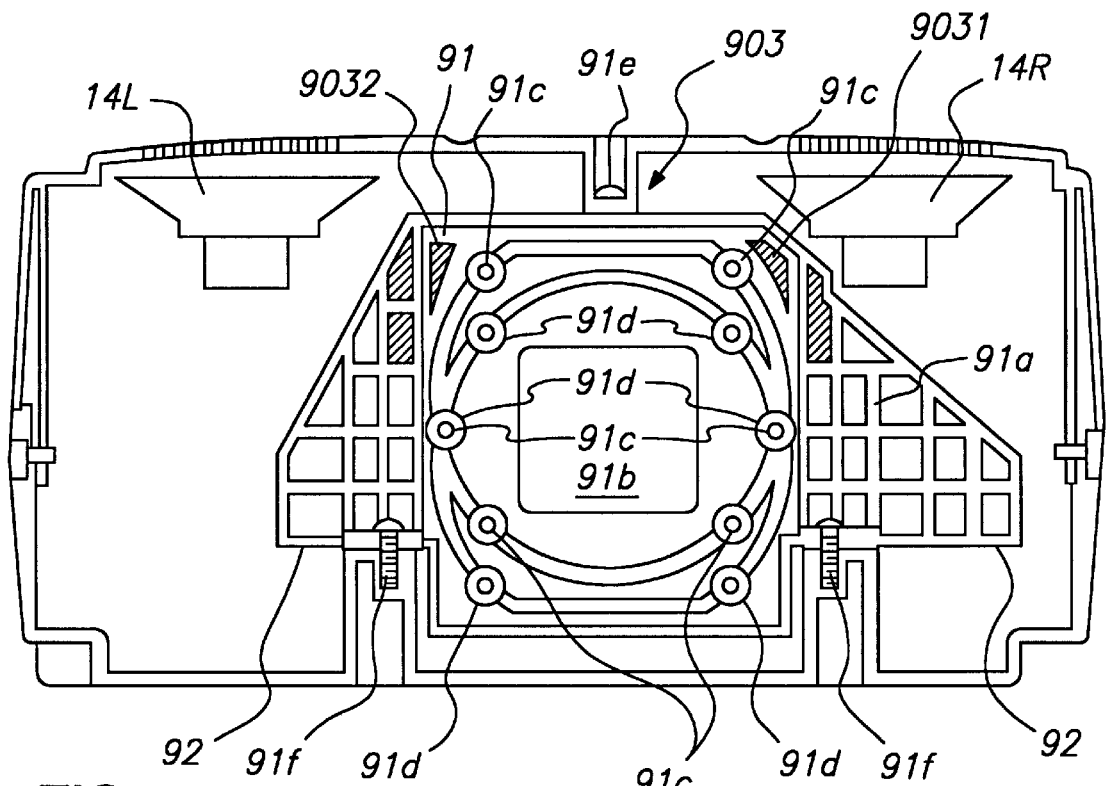
FIG._5
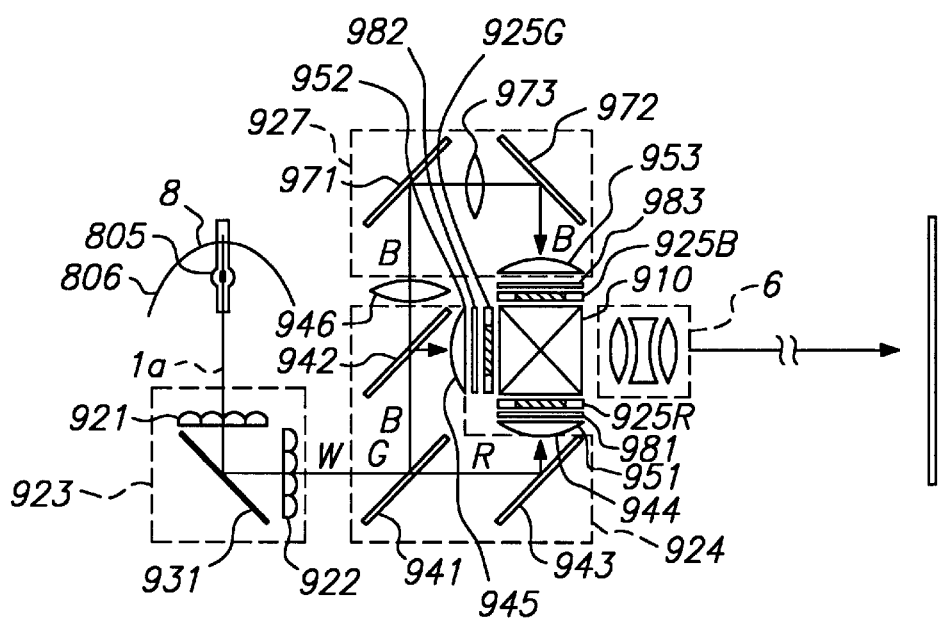
FIG._6

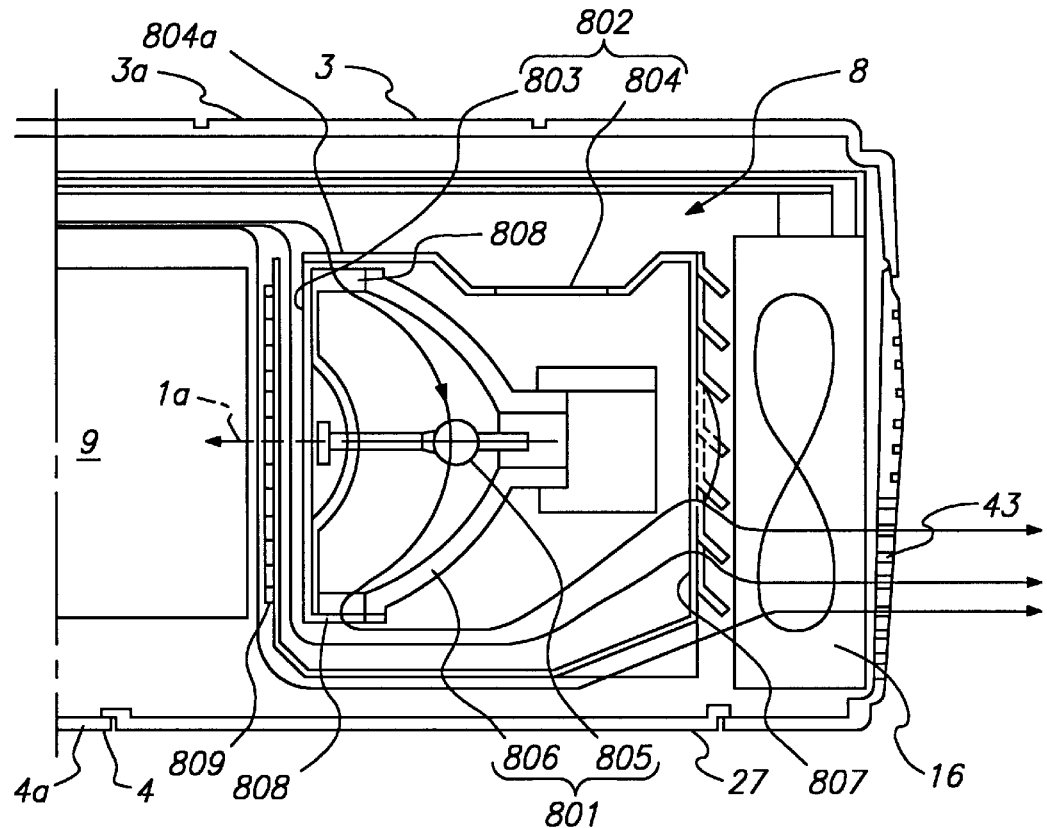
FIG._7
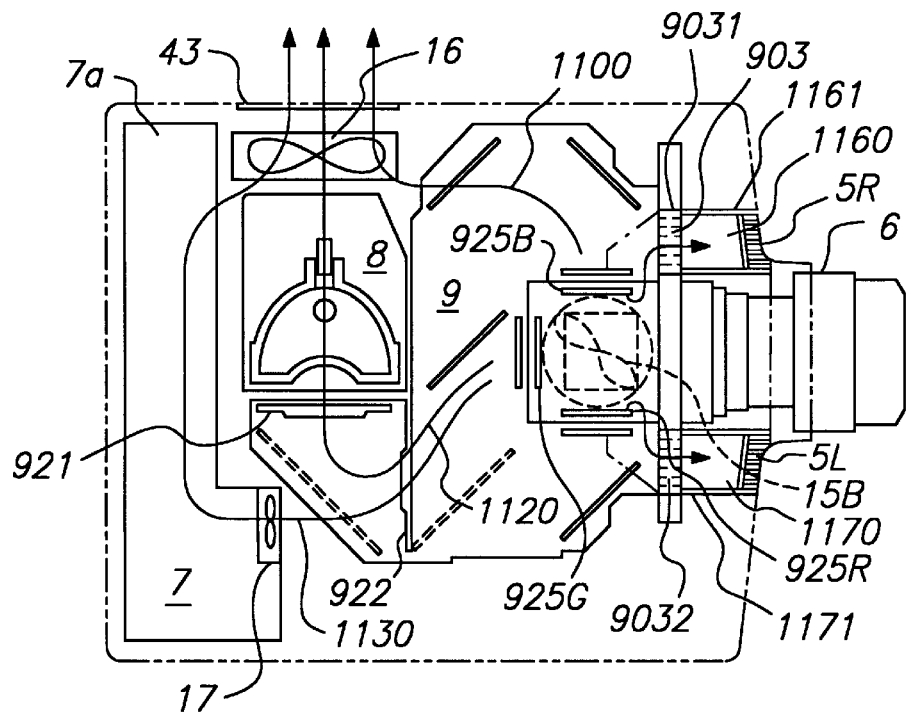
FIG._8

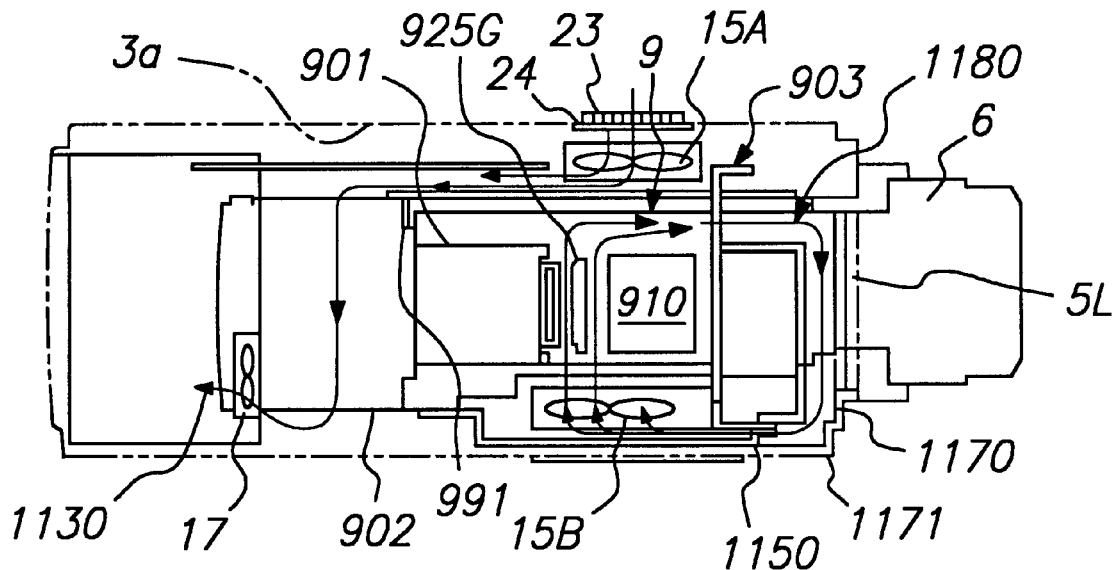
FIG._9
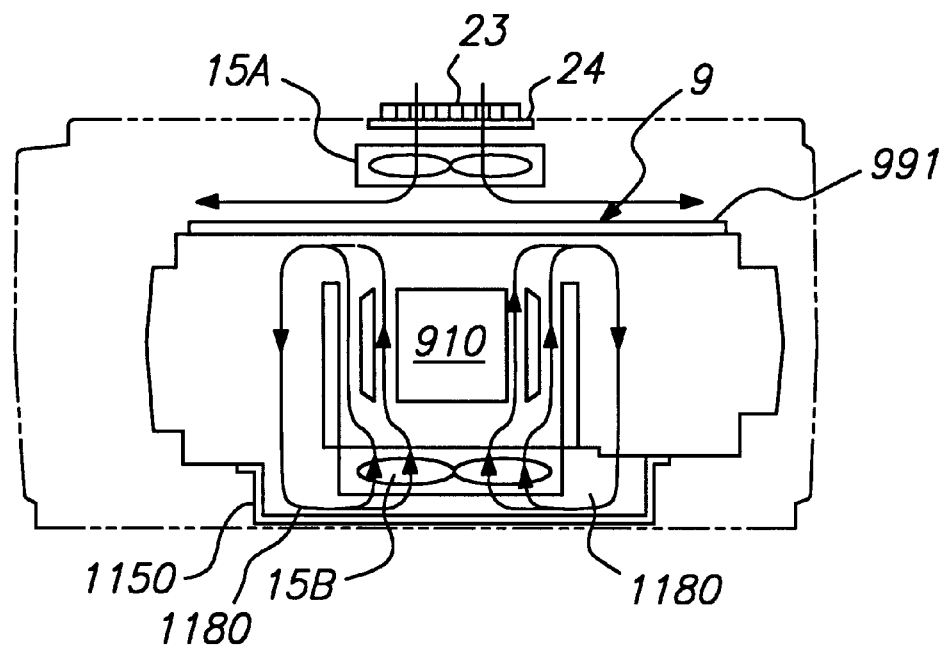
FIG._10

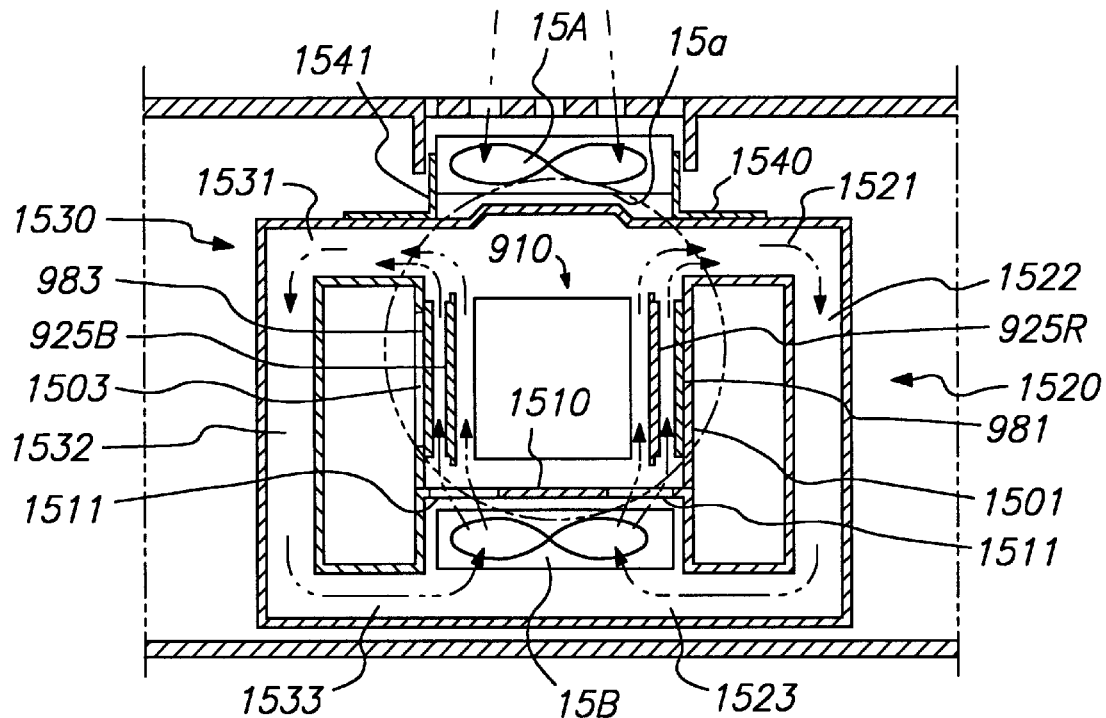
FIG._13
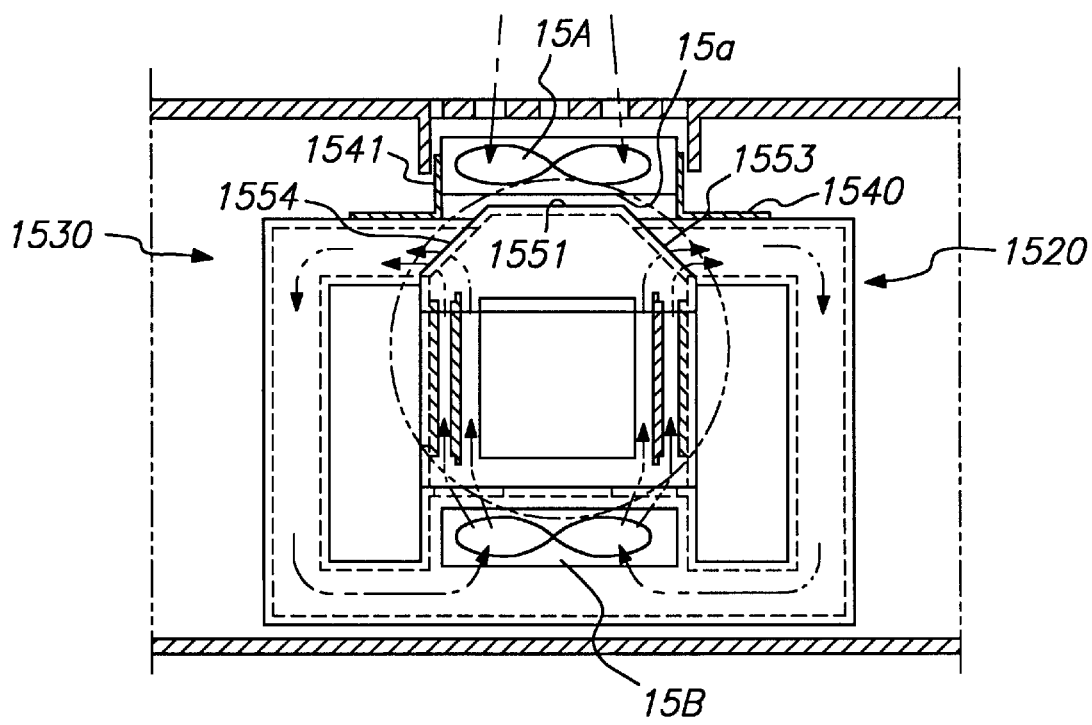
FIG._14

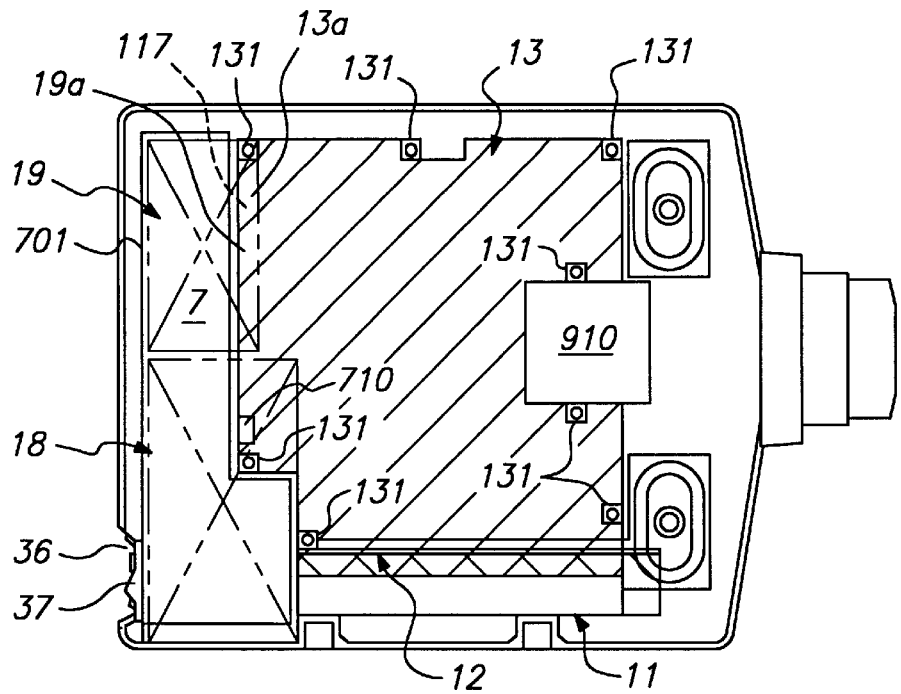
FIG._15
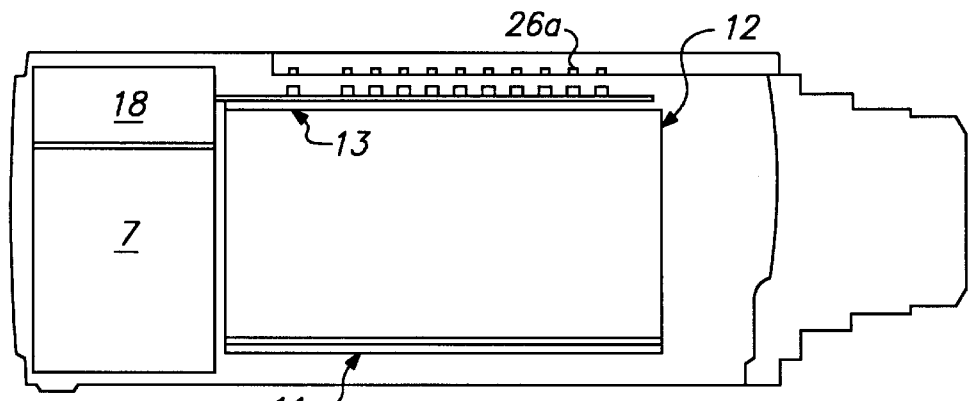
FIG._16
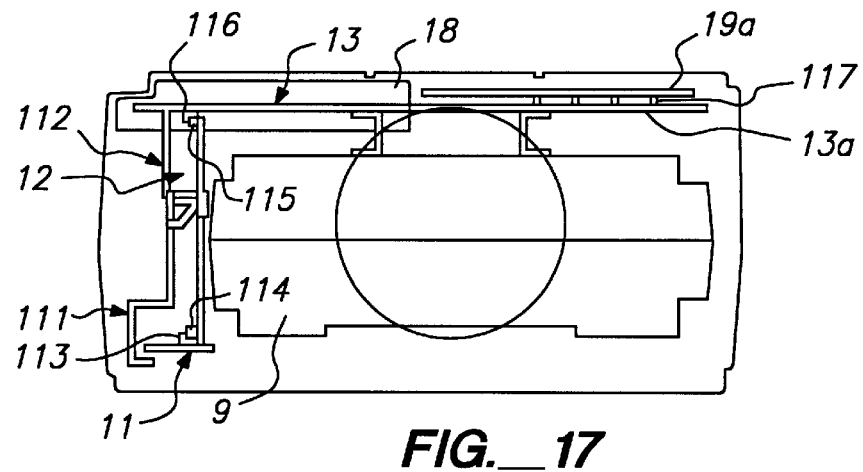
FIG._17

OPTICAL LENS UNIT HAVING INTERNALIZED FAN UNIT AND PROJECTION APPARATUS HOUSING THE SAME

FIELD OF THE INVENTION

The present invention relates to a projection display apparatus for separating a white light beam from a light source into three colored light beams, specifically red, blue, and green, passing each of these colored light beams through a light valve composed of a liquid crystal panel for modulation according to the image information, and then after modulation recombining the modulated light beams of each color through a projection lens for projection enlargement to a screen. More specifically, the present invention relates to a cooling mechanism for efficiently cooling the heat-emitting components of such a projection display apparatus.

DESCRIPTION OF THE RELATED ART

A projection display apparatus basically comprises a light source lamp unit; an optical lens unit for optically processing the white light beam emitted from the light source lamp unit to synthesize a color image according to the image information; a projection lens unit for projecting the light beam combined by the optical lens unit to a screen; a power supply unit; and a circuit board group on which the control circuitry, etc., is mounted.

Except for the projection lens unit, each of these components is housed inside the apparatus' outside case. The projection lens unit is generally mounted projecting from the front of the apparatus. An operating panel with the power switch, etc., a receptor window for the remote control, and an input/output terminal group for exchanging signals with an external device, are positioned on the front of the outside case.

A cooling mechanism for cooling internal heat sources such as the light source lamp unit and power supply unit is also built in to this type of projection display apparatus. In general, outside air is introduced through an intake opening in the outside case using an intake fan, and flows over the internal heat-emitting components to cool them. After cooling each of these parts, the outside air conducted inside the apparatus is vented by an exhaust fan to the ambient environment from an air vent opening in the outside case.

The heat-emitting components include each of the optical elements constituting the optical lens unit. More specifically, the liquid crystal light valve and polarizing plate, etc., absorb part of the passed light, and must therefore be sufficiently cooled to prevent overheating. Part of the outside air conducted into the apparatus is therefore directed to the heat-emitting components of the optical lens unit to also cool those components.

However, when air is introduced from outside the apparatus, dust and other foreign matter may also penetrate to the inside of the apparatus. An air filter is, of course, placed over the intake opening to capture dust and filter the air, but it is still possible for fine particulates to penetrate to the inside of the apparatus. When such particulates enter the inside of the apparatus with the outside air and pass over the surface of the optical elements inside the optical lens unit, the particulate may adhere to the surface of the optical elements. When particulate matter thus adheres, the particulate may also be projection enlarged, resulting in an image where the particulate matter is present may be blurred, and image quality deteriorates severely. It is therefore necessary to cool the optical elements inside the optical lens unit in a way that prevents particulate penetration.

However, a mechanism having a dustproof function and capable of efficiently cooling the optical elements inside the optical lens unit has not heretofore been proposed.

DISCLOSURE OF THE INVENTION

The object of the present invention is to provide a projection display apparatus comprising a cooling mechanism capable of efficiently cooling each of the components inside the optical lens unit without causing penetration of dust and particulate.

To achieve this object in a projection display apparatus comprising a light source lamp unit, an optical lens unit for optically processing the white light beam emitted from the light source lamp unit to form an optical image according to the image information, and a projection lens unit for projecting the optical image formed by the optical lens unit to a screen, the present invention uses a light guide defining the outside surfaces of the optical lens unit, and the top seal plate, bottom seal plate, and head plate fastened to the top, bottom, and front surfaces of the optical lens unit, to divide at least part of the inside of the optical lens unit into a substantially airtight internal space in which a circulation fan is disposed to create a circulating air current that circulates, for example, in the vertical direction and cools the optical elements positioned inside this internal space.

In the present invention, the part inside the optical lens unit in which the liquid crystal light valves and other heat-emitting components are disposed is separated into a substantially airtight state. A circulating air current is created by force inside this internal space, and the components are cooled by this air current. Therefore, unlike the prior art in which cooling is accomplished using air introduced from outside, cooling is accomplished in a state in which particulate is effectively not introduced from outside. As a result, particulates do not adhere to the surfaces of the light valves or other optical elements.

The liquid crystal light valves are usually the greatest heat-emitting components of the optical elements constituting the optical lens unit. Efficient cooling can therefore be achieved by locating the circulation fan below this part and blowing the air circulation current directly across the liquid crystal light valves.

It is further preferable to provide an outside air induction means for introducing outside air, and an intake air path for directing the introduced outside air around the outside surface of the members separating the airtight internal space, and thereby accomplish a heat exchange action between the circulating air current created in the internal space of the optical lens unit and the outside air flowing through the intake air path. For example, the intake air path may be formed passing over the top surface of the top seal plate to achieve a heat exchange action between the outside air and the circulating air current using the top seal plate to cool the circulating air current.

It is further preferable to enable heat exchange between the air current and outside air by circulating at least part of the circulating air current created in the internal space of the optical lens unit through an air path of which the outside surface is exposed to the outside. At the part of this air path where the outside surface is exposed to the outside, plural radiation fans are preferably provided to increase the radiation efficiency.

In the present invention thus comprised, heat is dissipated by means of the heat exchange between the air current circulating inside and the outside air flowing over the outside surface of the part defining the outside surface of the optical lens unit, e.g., the top seal plate. Alternatively, heat is dissipated to the outside by flowing the circulating air current through an air path of which the outside surface is exposed to the outside. Heat dissipation from the circulating air current is therefore efficiently accomplished. As a result, the inside of the optical lens unit is efficiently cooled by the circulating air current.

It should be noted that if an integrator lens, which is a uniform lighting optical element, is used, the amount of heat emitted by the liquid crystal light valves, etc., can be even further suppressed. Even more efficient cooling can therefore be achieved.

In an alternative embodiment of the present invention the internal space described above is formed by means of a dustproof box surrounding at least part of the optical elements contained in the optical lens unit in a substantially airtight state. In this case, too, the optical elements housed in the dustproof box are the high heat-emitting liquid crystal light valves, etc.

When the airtight space is formed inside the optical lens unit using a dustproof box, it is necessary to form an opening in the side of the dustproof box to pass the light beams travelling to the liquid crystal light valves disposed therein. The inside of the dustproof box can be kept airtight by applying the polarizing plate over this opening from the inside of the dustproof box.

The circulating air current formed inside the dustproof box preferably flows over the surface of the liquid crystal light valves, etc. In addition, if the outside air inducer means for introducing outside air is disposed directly above the dustproof box, and the intake air path is formed to direct the outside air introduced by the outside air induction means over the outside surface of the dustproof box. In turn, heat exchange occurs between the circulating air current created inside the dustproof box and the outside air flowing through the intake air path, and the inside of the dustproof box is efficiently cooled. Furthermore, if an air return duct for returning the air driven by the circulation fan to the circulation fan is provided and the outside surface of the air return duct is used as the radiation surface, the inside of the dustproof box can be cooled with even greater efficiency.

BRIEF DESCRIPTION OF THE DRAWINGS

FIGS. 1A–1C show the outside appearance of a projection display apparatus according to the first embodiment of the present invention, FIG. 1A being an oblique view from the front thereof, FIG. 1B being an oblique view from the back thereof, and FIG. 1C being a bottom view;

FIGS. 2A and 2B show the arrangement of each unit disposed inside the apparatus in FIGS. 1A–1C wherein FIG. 2A shows the relative planar positions, and FIG. 2B shows the relative positions in the vertical direction;

FIGS. 3A and 3B show the extracted optical lens unit and projection lens unit, with FIG. 3A being a simplified plan view thereof and FIG. 3B being a simplified cross section thereof;

FIGS. 4A and 4B show the extracted head plate, prism unit, and projection lens unit, with FIG. 4A being a simplified plan view thereof and FIG. 4B being a simplified cross section thereof;

FIG. 5 is a side view showing the method of fastening the head plate, projection lens unit, and outside case;

FIG. 6 is a simple configuration diagram of the optical system assembled in the apparatus of FIG. 1.

FIG. 7 is a simple cross section of the light source lamp unit taken along line 2000 shown in FIG. 2A;

FIG. 8 is a descriptive diagram showing the planar flow of the cooling air current according to the first embodiment;

FIG. 9 is a descriptive diagram showing the vertical flow of the cooling air current according to the first embodiment;

FIG. 10 is a descriptive diagram showing the vertical flow of the cooling air current from the head on perspective;

FIG. 13 is a configuration diagram showing a cross section through line 2001 shown in FIG. 12.

FIG. 14 is a configuration diagram showing a cross section through line 2002 in FIG. 12; and FIG. 15, FIG. 16, and FIG. 17 are descriptive diagrams showing the installation positions of the circuit boards in the apparatus shown in FIG. 1.

PREFERRED EMBODIMENTS OF THE INVENTION

Figure 11:
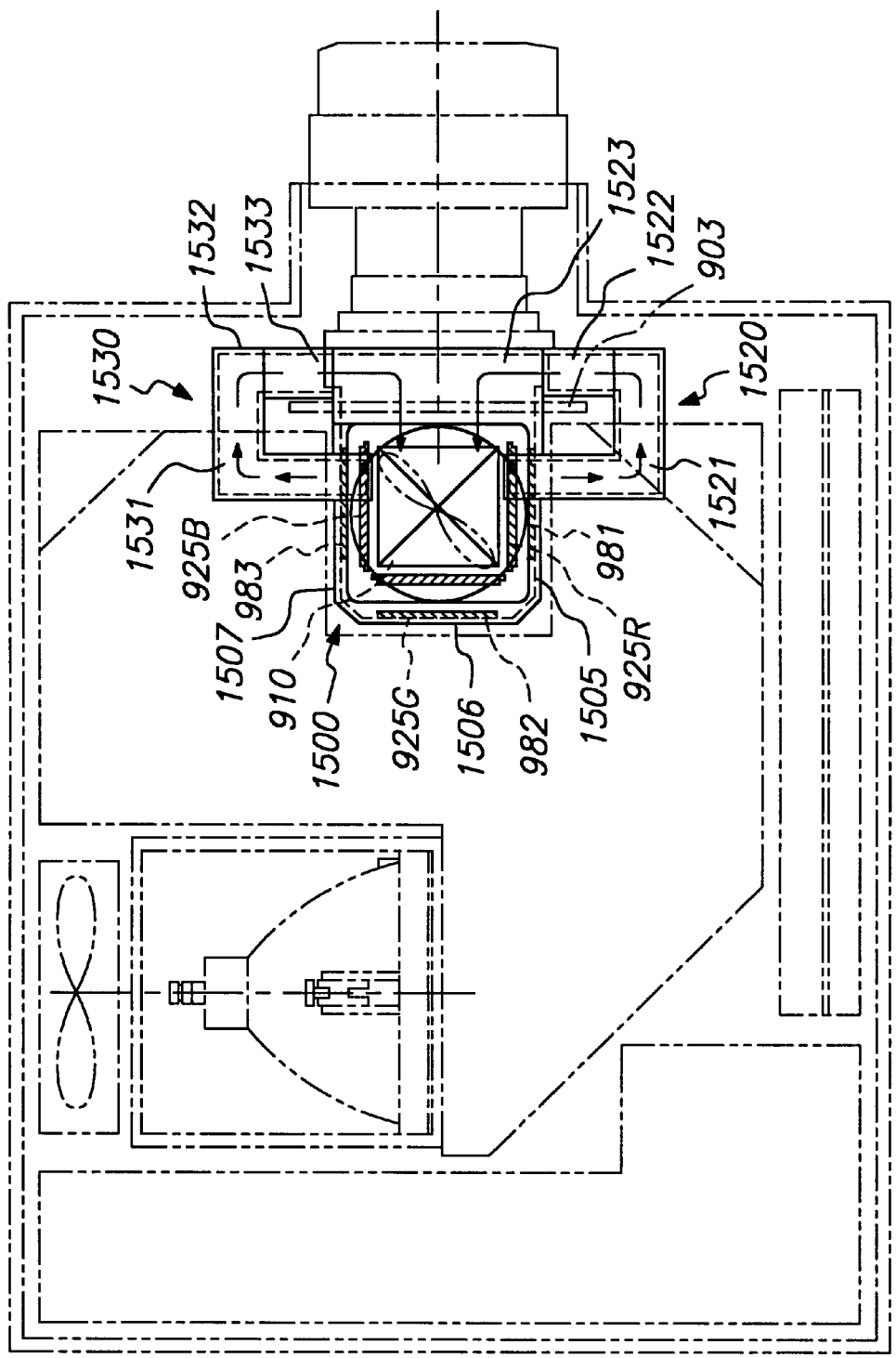
FIG. 11 is a simple configuration diagram showing the planar configuration of a cooling mechanism using a dustproof box according to a second embodiment of the invention.

Projection display apparatus embodimentsapplying the present invention is described below with reference to the accompanying figures.

A. Overal configuration

FIGS. 1A–1C show the outside appearance of a projection display apparatus according to the first embodiment.

Projection display apparatus 1 overall has a flat, rectangular parallelopiped shape covered by outside case 2. Outside case 2 basically comprises upper case 3, lower case 4, and front case 5 defining the front surface of the apparatus. The front part of projection lens unit 6 projects from the middle of front case 5.

The relative positions of the various components inside outside case 2 of projection display apparatus 1 are shown in FIG. 2. Inside outside case 2 at the back thereof is provided power supply unit 7. The light source lamp unit 8 and optical lens unit 9 are positioned adjacent thereto toward the front of the apparatus. The base of the projection lens unit 6 is positioned at the center in front of the optical lens unit 9.

An interface circuit board 11 on which the input/output interface circuit is mounted is provided on one side of the optical lens unit 9 oriented front-to-back in the apparatus. Parallel to the interface circuit board 11 is disposed the video circuit board 12 on which the video signal processing circuit is mounted. The control circuit board 13 for apparatus drive control is disposed above the light source lamp unit 8 and optical lens unit 9. Speakers 14R and 14L are provided at the right and left corners at the front of the apparatus.

Air cooling intake fan 15A is disposed in the middle above optical lens unit 9, and circulation fan 15B for creating the internal air circulation current for cooling is disposed in the middle below optical lens unit 9. Exhaust fan 16 is disposed on the side of the apparatus abutting the back of light source lamp unit 8. Auxiliary cooling fan 17 for pulling the cooling air current from air cooling intake fan 15A into power supply unit 7 is disposed at a position facing the edges of circuit boards 11 and 12 in power supply unit 7.

Directly above power supply unit 7 at a position on the left side of the apparatus is disposed floppy disk drive unit (FDD) 18.

B. Structure of the Outside Case

As shown in FIGS. 1A–1C, upper case 3 of outside case 2 is formed from a rectangular top panel 3a, and right and left side walls 3b and 3c and back wall 3d extending downward substantially perpendicularly from the three sides of top panel 3a not including the front. Lower case 4 likewise comprises a rectangular bottom panel 4a, and right and left side walls 4b and 4c and back wall 4d rising substantially perpendicularly from the three sides of bottom panel 4a not including the front. Front case 5 curves outward with the middle thereof projecting slightly forward; a circular opening 5b around which is formed annular rim 5a is left uncovered in this projecting part, and through this opening the front end of projection lens unit 6 extends to the front of the apparatus. Upper case 3 and lower case 4 are connected together at two places each on the right and side walls by means of fastening screws 21a, 21b and 22a, 22b. Front case 5 is held by and between upper case 3 and lower case 4 above and below.

Air filter cover 23 is fastened in a position at the front center of top panel 3a of upper case 3. Plural air holes are formed in this cover 23, on the inside of which air filter 24 is attached so that particulate matter will not penetrate there through (see FIG. 2B). The above intake fan 15A is positioned behind air filter 24. At the right and left front edges of top panel 3a plural through-holes 25R and 25L are formed at positions corresponding to the built-in speakers 14R and 14L. Operating switch cover 26 is provided along the left side edge of top panel 3a. This operating switch cover 26 hinges on one edge thereof. When this operating switch cover 26 is opened, the plural operating switches (not shown in the figure) arrayed inside operating switch cover 26 are exposed.

A lamp replacement cover 27 is disposed to bottom panel 4a of lower case 4 at a position corresponding to the built-in light source lamp unit 8. This lamp replacement cover 27 is screwed to bottom panel 4a, and light source lamp unit 8 can be replaced by loosening the screws and removing cover 27.

Height adjustment feet 31R and 31L are disposed at the front right and left corners of bottom panel 4a. Fine adjustment of the height is possible by turning these feet 31R and 31L. Rough adjustment of the height of feet 31R and 31L is possible by operating height adjustment buttons 32R and 32L (only button 32L is shown in the figure) projecting at the bottom on both ends of front case 5.

Projection 33 is formed in the middle at the back side of bottom panel 4a such that apparatus 1 can be placed on a table supported at three points by this projection 33 and the two feet 31. To prevent instability when placed on an uneven surface, auxiliary projections 34R and 34L are also formed on both side ends at the back of the bottom panel.

Receptor windows 35F and 35R are disposed at the top right of front case 5 defining the front of the apparatus, and in the middle of back wall 3d of upper case 3 defining the top half of the back of the apparatus. These receptor windows are for receiving the control beam from a remote control. Because receptor windows are formed at both the front and back of the apparatus, remote control is possible from both the front and back of the apparatus for convenience. Radiators 5R and 5L with plural exposed radiator fins are formed vertically oriented on the right and left sides of projection lens unit 6 in the middle of front case 5. These radiators release to the outside heat from the air current circulating inside the optical lens unit.

AC inlet 36 for supplying power from an external source, and main power switch 37, are disposed at a position on the left edge of the back wall 4d of lower case 4 defining the bottom half of the back of the apparatus.

As shown in FIG. 1A, a carrying handle 38 is attached to the left side of the apparatus. The two base parts 38a and 38b of this handle 38 are attached to the overlapping part of side walls 3b and 4b of upper case 3 and lower case 4 in a manner allowing the handle to pivot. A handle housing recess 3e is formed in side wall 3b of the upper case so that handle 38 can be housed therein. An LED display 39 for displaying the operating status of the apparatus is disposed at the top of side wall 3b. An input/output terminal cover 41 hinging on the bottom edge thereof is provided in the left side wall 4b of the lower case. The plural input/output terminals (not shown in the figure) arrayed therein are exposed when this is opened.

A floppy disk insertion opening 18a is formed horizontally at a position close to top panel 3a at the back of upper case side wall 3b on the left side of this apparatus. Eject button 18b is disposed at the right above this insertion opening 18a.

On the opposite side of the apparatus, i.e., in upper case and lower case side walls 3c and 4c defining the right side, ventilation opening 43 is formed spanning both side walls. Exhaust fan 16 for cooling is formed on the inside of this ventilation hole 43 with an air filter disposed therebetween.

C. Light source Lamp Unit

Light source lamp unit 8 is described with reference to FIG. 2A and FIG. 7. Light source lamp unit 8 comprises light source lamp 801 and the substantially rectangular parallelopiped-shaped lamp housing 802 in which this is housed. Lamp housing 802 is a double-walled structure of inner housing 803 and outer housing 804. Light source lamp 801 comprises a halogen lamp or other lamp body 805, and reflector 806, and emits the light from lamp body 805 along optical axis 1a toward optical lens unit 9.

The front of outer housing 804 in the optical axis 1a direction is an opening to which ultraviolet filter 809 is mounted. Plural slit group 807 for passing the cooling air is formed in the back in the optical axis 1a direction. Inner housing 803 is mounted to the front of light source lamp 801; the part through which the emitted light passes is an opening, around which plural air cooling through-holes 808 are formed. It should be noted that inner housing 803 and light source lamp 801 are formed as a single unit in the present embodiment. The lamp can be replaced by removing and replacing this unit.

D. Optical Lens Unit

As shown in FIG. 3A, optical lens unit 9 comprises the optical elements other than prism unit 910, which functions as the color synthesis means, disposed vertically between the top and bottom light guides 901 and 902. Top light guide 901 and bottom light guide 902 are fastened by set screws to upper case 3 and lower case 4, respectively. The top and bottom light guides 901 and 902 are similarly fastened by set screws to prism unit 910.

Prism unit 910 is fastened by set screws to the back of head panel 903, which is a thick diecast member. The base of projection lens unit 6 is similarly fastened by set screw to the front of this head panel 903. The present embodiment is therefore constructed with prism unit 910 and projection lens unit 6 fastened as a single unit with head panel 903 disposed therebetween. Both of these units are thus integrated on opposite sides of a high rigidity head panel 903. As a result, optical axis misalignment between these components does not occur even if an impact acts on the side of projection lens unit 6.

E. Optical System

Only the optical system of projection display apparatus 1 is shown in FIG. 6. The optical system comprises illumination optics system 923 comprising lamp body 805 described above, integrator lenses 921 and 922, which are uniform lighting optical elements, and polarized light conversion elements disposed adjacent to integrator lens 922; color separation optics system 924 for separating the white light beam W emitted from illumination optics system 923 into red, green, and blue color light beams R, G, and B; three liquid crystal light valves 925R, 925G, and 925B as the light valves for modulating the color light beams; prism unit 910 as the color synthesis optics system for recombining the modulated color light beams; and projection lens unit 6 for projection enlarging the mixed light beams to a screen. Light guide 927 is also provided for guiding the blue light beam B of the color light beams separated by color separation optics system 924 to the corresponding liquid crystal valve 925B.

A halogen lamp, metal halide lamp, xenon lamp, or other lamp may be used as light source lamp 805. Uniform illumination optics system 923 comprises reflecting mirror 931 for perpendicularly bending the central optical axis 1a of the light emitted from the illumination optics toward the front of the apparatus. Integrator lenses 921 and 922 are placed on opposite sides of reflecting mirror 931 perpendicularly to each other.

Color separation optics system 924 comprises blue-green reflecting dichroic mirror 941, green reflecting dichroic mirror 942, and reflecting mirror 943.

The blue light beam B and green light beam G contained in the white light beam W are first reflected perpendicularly by blue-green reflecting dichroic mirror 941 toward green reflecting dichroic mirror 942. The red light beam R passes through this mirror 941, is reflected perpendicularly by reflecting mirror 943 therebehind, and is emitted toward prism unit 910 from the red light beam emitter 944.

Of the blue and green light beams B and G reflected by mirror 941, only the green light beam G is perpendicularly reflected by green reflecting dichroic mirror 942, and emitted from green light beam emitter 945 to the color synthesis optics system. The blue light beam B passing through this mirror 942 is emitted to the light guide system from the blue light beam emitter 946.

The distance from the white light beam emitter of the uniform illumination optics system to the emitter 944, 945, and 946 of each color light beam in color separation optics system 924 is designed to be equal in the present embodiment.

A condenser lens 951, 952, and 953, respectively, is disposed on the emitting side of the emitter 944, 945, and 946 of each color light beam in color separation optics system 924. As a result, the color light beams emitted from the respective emitters are incident on these condenser lenses 951, 952, and 953 and made parallel.

Of the parallel color light beams R, G, and B, the red and green light beams R and G are passed through polarizing plates 981 and 982 to align the polarization axes, and are then incident on and modulated by liquid crystal light valves 925R and 925G to contain the image information of the respective color of light.

Specifically, these light valves are switch-controlled according to the image information by a drive means not shown in the figures, thereby modulating each color of light passing through the light valve. This drive means may be a means of any known design. The blue light beam B, however, is guided to the corresponding liquid crystal light valve 925B through light guide 927 and polarizing plate 983, and is similarly modulated thereby according to the image information. The light valves of the present embodiment may use, for example, a polysilicon TFT as the switching element.

Light guide 927 comprises incidence-side reflecting mirror 971, emitting-side reflecting mirror 972, middle lens 973 disposed therebetween, and condenser lens 953 disposed in front of liquid crystal panel 925B. The optical path of each colored light beam, specifically the distance from lamp body 805 to each liquid crystal panel, is longest for the green light beam G, and the light loss of this light beam is therefore greatest. Light loss can be suppressed, however, by inserting light guide 927. The optical path of each colored light beam can thus be made effectively equivalent.

The color light beams modulated by passing through liquid crystal panels 925R, G, and B are incident on the color synthesis optics system and remixed thereby. The color synthesis optics system in the present embodiment is comprised using prism unit 910, which is a dichroic prism as described above. The color image remixed here passes projection lens unit 6 and is projection enlarged to a screen at a predetermined position.

Note that in addition to the above configuration, a ½ wavelength plate is preferably disposed in the path of the light beam of each color to align the light beam of each color to S polarized light in the present embodiment. By thus making it possible to use only S polarized light, color separation by the dichroic mirrors can be improved when compared with using random polarized light in which P polarized light and S polarized light are mixed. Furthermore, because light guide 927 reflects the light beams using mirrors, and the reflectivity of S polarized light is better than that of P polarized light, this configuration also offers the benefit of being able to suppress light loss.

F. Power Supply Unit

As shown in FIGS. 2A and 2B, the components of power supply unit 7 are built in to metal shield case 701, which prevents electrical and magnetic noise generated in this part from leaking outside. Shield case 701 is sized to extend between the right and left side walls of outside case 2 of the apparatus with the left end being a flat face of a particular width projecting toward the front of the apparatus. More specifically, reflecting mirror 931 of the uniform illumination system in optical block 9 is disposed in front of this projecting part 702 at a 45 degree angle to the front-back direction of the apparatus. The space behind this reflecting mirror 931 easily becomes dead space. To efficiently utilize this space 703, shield case 701 in the present embodiment projects into this space 703 to form projecting part 702 and thereby assure space for placing the components of the power supply unit.

Shield case 701 of power supply unit 7 has a rectangular, hollow cross section, the rigidity of which is greater than that of the other parts. The bottom of this case 701 is fastened to bottom panel 4a of lower case 4 by plural set screws. The top is likewise fastened by plural set screws to top panel 3a of upper case 3. Because upper case 3 and lower case 4 are thus fastened to a high rigidity shield case 701 at the back of the apparatus, the outside case at the back of the apparatus is highly integrated and the rigidity is increased.

Power supply unit 7 is heavier than the other components disposed inside the apparatus. In addition to power supply unit 7, the heavy components inside the apparatus are prism unit 910 and projection lens unit 6 fastened before and after head panel 903. As will be known from FIG. 2, power supply unit 7 is disposed at the back of the apparatus with the long dimension thereof oriented side to side. Furthermore, by appropriately positioning the component elements of power supply unit 7, the center of gravity of the power supply unit 7 can be adjusted to the widthwise center of the apparatus. Corresponding to this, prism unit 910 and projection lens unit 6 are disposed in the center at the front of the apparatus.

The center of gravity of the apparatus in the present embodiment is therefore located at substantially the center of the apparatus in both the width and frontback directions of the apparatus. As a result, if carrying handle 38 is pulled out, the apparatus is carried with the left side of the apparatus facing up as shown in FIG. 2A, and the apparatus is accidentally dropped, the apparatus will fall in this same attitude because the center of gravity of the apparatus is positioned in the middle front-back and left-right.

If the center of gravity of the apparatus is offset front-back or left-right, the apparatus will fall while tilting toward the center of gravity. If the apparatus falls in this manner, a corner of the outside case of the apparatus will strike the floor, etc., first, causing an excessive impact force to act locally with a high risk of that part being damaged. However, because the apparatus will fall without tilting frontback or left-right in the present embodiment, the entire right side of the apparatus on the bottom [as the apparatus is carried] will strike the floor at substantially the same time with the benefit being an extremely low chance of local damage occurring.

Conventionally only the bottom or top of power supply unit 7 is fastened to outside case 2. As will be known from FIG. 2B, however, power supply unit 7 is fastened in the present embodiment to outside case 2 by means of set screw 704 at a height corresponding to the center of gravity of power supply unit 7 in the top-bottom direction of the apparatus. In this example, it is fastened to back wall 4d of lower case 4. As a result, front-back movement of power supply unit 7 can be effectively prevented when an impact is applied to the apparatus in the front-back direction.

By making the power supply path, etc., to each of the drive components from power supply unit 7 of the present embodiment as short as possible, the lead wires that are a source of noise can be made as short as possible, and emission of noise therefrom can be suppressed. AC inlet 36 and main power switch 37 are directly fastened to the back of shield case 701 of power supply unit 7. The lead wires from these parts to power supply unit 7 can therefore be eliminated.

Interlock switch 710, which operates in conjunction with opening and closing lamp replacement cover 27 on the back of the apparatus, is also provided integrally to the front face of shield case 701 of power supply unit 7. More specifically, interlock switch 710 is provided at a place slightly separated to the right side of the apparatus from shield case projecting part 702. The operating part 711 of this interlock switch 710 faces down. This operating part 711 is normally pushed up by operating pin 271 extending vertically from the top of lamp replacement cover 27. Interlock switch 710 is on in this position. When lamp replacement cover 27 is removed, the operating part of interlock switch 710 moves downward, and the switch switches off. Thus, the switch 710 conventionally in a position separated from power supply unit 7 is fixed to the side of shield case 701 of the power supply unit, and the lead wires thereto can be shortened.

Moreover, in power supply unit 7 of the present embodiment, the ballast circuit component 720 that is the drive circuit of light source lamp unit 8 disposed adjacent to the front of the apparatus is positioned on the same side as lamp unit 8, and the lead wires from here to lamp unit 8 can be extremely short.

Thus, the power supply paths from power supply unit 7 to each of the driven components can be extremely short with the present embodiment. Noise sources are therefore few compared with conventional designs, and the amount of emitted noise can be reduced.

G. FD Drive Unit

The FD drive unit 18 is fastened by screws, etc., to the top of power supply unit 7, which is mounted inside the apparatus in the present embodiment in a method improving the shock resistance and drop strength as described above. Of the internal components of the projection display apparatus, the optical system components are not solidly covered by the shield case. As a result, when FD drive unit 18 is mounted to part of such optical system, a reinforcing member must be separately provided for installation. However, power supply unit 7 and light source lamp unit 8 are covered by a case as described above, and the top of the case is typically flat. FD drive unit 18 is fixed to this flat part in the present embodiment. It is therefore possible to provide said FD drive unit 18 without it being necessary to provide a separate member or reinforcing member to fasten FD drive unit 18.

Mounting FD drive unit 18 on the top of power supply unit 7 and light source lamp unit 8 has the advantage of being able to use the shield cases as an electrical ground.

FD drive unit 18 is also disposed at a position offset to the left side on top of power supply unit 7. The reason for this is that FD insertion opening 18a of said unit 18 is positioned in side wall 3b on the left side of the apparatus' outside case. The operating switch group is provided toward the top plate side of this left side wall 3b, and input/output components for input/output connections with external devices are provided towards the bottom plate part of left side wall 3b. Therefore, if FD insertion opening 18a is provided at this position, all operations acting on apparatus 1, including inserting and removing floppy disks, can be accomplished from the left side wall 3b of the apparatus for convenience.

H. Circuit Board Arrangement

The arrangement of interface circuit board 11, video circuit board 12, control circuit board 13, and drive circuit board 19 on which the drive control circuit for FD drive unit 18 is mounted, is described with reference to FIG. 15, FIG. 16, and FIG. 17.

First, as shown in FIG. 15, control circuit board 13 is positioned parallel to top panel 3a of upper case 3 at a position toward the bottom of top panel 3a, and is fastened to upper case 3 by set screws at plural points around the outside perimeter of the circuit board. This control circuit board 13 is shaped to cover the top of optical system block 9 and light source lamp unit 8. The part directly above prism unit 910 is shaped with a square notch. Contacts corresponding to operating switch group 26a disposed along the left side edge of the apparatus top are arrayed along the left side edge of this circuit board 13.

As will be known from FIG. 17, interface circuit board 11 is disposed parallel to at a position slightly higher than bottom panel 4a of lower case 4. Video circuit board 12 is disposed parallel to the left side wall of the apparatus rising vertically from the surface side of this interface circuit board 11. These two circuit boards 11 and 12 are supported by circuit board support bracket 111 fastened to bottom panel 4a of lower case 4. Shield plate 112 is disposed at the top of circuit board support bracket 111, and the top edge of this shield plate 112 extends to the top edge of video circuit board 12. A shielded space is thus formed between these two circuit boards 11 and 12, shield plate 112, and circuit board support bracket 111. Noise emitted from the electrical elements and electronic elements arrayed therebetween is thus prevented from leaking to the outside.

Drive circuit board 19 is disposed to a position adjacent to the right side of the apparatus relative to FD drive unit 18. This drive circuit board 19 is positioned parallel to at the back of top panel 3a with the front part 19a thereof partially overlapping the top of back edge part 13a of control circuit board 13.

The electrical connections between the circuit boards are as follow. First, connector 113 to video circuit board 12 is disposed on the surface of interface circuit board 11. A connector 114 enabling insertion connection to this connector 113 is provided on the surface at the bottom edge of video circuit board 12. Likewise, a connector 115 to control circuit board 13 is provided on the surface at the top edge of video circuit board 12. On the back of control circuit board 13 is provided a connector 116 enabling insertion connection to this connector 115. When each of the circuit boards 11, 12, and 13 is thus arrayed as shown in FIG. 17, the mutually corresponding connectors are connected.

In addition, control circuit board 13 and drive circuit board 19 are electrically connected to each other through insertion-compatible connectors 17 [disposed] between back edge part 13a of control circuit board 13 and front part 19a of the drive circuit board positioned above back edge part 13a.

Connections between each of the circuit boards is thus achieved in the present embodiment without using lead wires. There are therefore fewer noiseemitting sources, and noise emissions can therefore be suppressed.

As will also be known from FIG. 15, the corner areas around the perimeter of control circuit board 13 are fastened using set screws to outside case 2, i.e., to the ground. These comer areas are parts where noise occurs easily. However, if these parts are grounded as in the present embodiment, noise emissions can be suppressed.

I. Structure of the Head Panel

The shape of head panel 903 is described referring primarily to FIGS. 4A, 4B and FIG. 5. Head panel 903 basically comprises vertical wall 91 in a vertical attitude widthwise to the apparatus, and bottom wall 92 extending horizontally from the bottom edge of this vertical wall 91. As shown in FIG. 5, vertical wall 91 is a high rigidity wall comprising plural reinforcing ribs 91a formed vertically and horizontally on the surface. A square opening 91b through which the beam emitted from prism unit 910 passes is formed in the center of vertical wall 91. Screw holes 91c for the prism unit set screws, and screw holes 91d for fastening the base of the projection lens unit 6, are also formed in vertical wall 91. As will be known from FIG. 4, the base of projection lens unit 6 is fastened to the surface of the front of vertical wall 91, and prism unit 910 is fastened to the surface of the back of vertical wall 91.

Prism unit 910 and projection lens unit 6 are thus fastened in an aligned position on opposite sides of a high rigidity vertical wall 91. The integration of these units is therefore high, and there is very little chance of them becoming misaligned to each other even if an impact force acts thereon.

Circulation fan 15B is mounted to the back of bottom wall 92 of head panel 903. Through-holes (not shown in the figures) for passing the cooling air are formed in this bottom wall 92.

As will be known from FIG. 2B and FIG. 4A, mounting members 91e and 91f to upper case 3 and lower case 4 are formed on the top and bottom edges, respectively, of vertical wall 91 of head panel 903. These parts are secured by set screws to upper case 3 and lower case 4, respectively.

The backs of upper case 3 and lower case 4 are thus fastened to power supply unit 7, and the fronts are fastened to head panel 903. Because they are fastened at front and back to a high rigidity part, upper case 3 and lower case 4 are both highly integrated and rigid. Impact resistance is therefore improved, and damage resulting from dropping, etc., is minimal.

J. Cooling Mechanism

The cooling mechanism of the heat-emitting components of projection display apparatus 1 according to the first embodiment is described next with reference to FIG. 7, FIG. 8, FIG. 9, and FIG. 10.

A plan view of the basic cooling air flow path formed inside projection display apparatus 1 is shown in FIG. 8. Outside air is pulled inside the apparatus by cooling intake fan 15A through vent hole 23 formed in top panel 3a of apparatus 1. The introduced air flows horizontally through the space (intake path) between apparatus top panel 3a and top seal plate 991 defining the top of optical lens unit 9, and is vented outside by exhaust fan 16 disposed on the right side of the apparatus.

Regarding the important air flow channels as shown in a plan view by the bold lines in FIG. 8, one air current 1100 passes over the top of top seal plate 991 disposed above optical lens unit 9 directly to exhaust fan 16, and is vented thereby to the outside.

Another air current 1120 flows to the back over top seal plate 991 disposed above optical lens unit 9, and flows from the front of light source lamp unit 8 to the inside thereof through through-holes 804a formed in the outer housing 804 and through through-holes 808 formed in the inner housing 803. After passing through here, the air passes through vent hole 807 on the back and is vented to the outside through exhaust fan 16 behind vent hole 807.

Yet another air current 1130 flows to the back over the top of optical lens unit 9, is pulled into power supply unit 7 by auxiliary cooling fan 17 mounted on the end of power supply unit 7, passes through the inside [of power supply unit 7], and is pulled by exhaust fan 16 mounted on the other side for venting to the outside.

1. Cooling the power supply unit

The vertical flow of the flow path of air current 1130 passing inside power supply unit 7 is shown in FIG. 9. After being pulled in from the outside by intake fan 15A, air current 1130 flows to the back over top seal plate 991 disposed above optical lens unit 9. It next passes through-holes (not shown in the figure) present in top light guide 901 and drops to the part of optical lens unit 9 where integrator lenses 921 and 922, which are uniform lighting optical elements, are disposed. The air current then flows down from through-holes opened in bottom light guide 902. Finally, it flows to exhaust fan 16 and is vented by exhaust fan 16 to the outside.

As thus described, an auxiliary exhaust fan 17 is disposed in the present embodiment to forcefully introduce a cooling air current into power supply unit 7. The inside of the power supply unit, which is a source of heat emissions, can therefore be effectively cooled.

2. Cooling the light source lams unit

The vertical flow of the flow path of air current 1120 passing light source lamp unit 8 is shown in FIG. 7. Air current 1120 flows through the space between top light guide 901 and the back of upper case top panel 3a to the top front of light source lamp unit 8 on the emitting side thereof. From here the air flows over the surfaces of each of the components of light source lamp unit 8, and reaches exhaust fan 16 at the back. In other words, air current 1120 flows over the inside and outside surfaces of outer housing 804, and flows over the inside and outside surfaces of inner housing 803. In addition, it flows over the surface of reflector 806.

An air current 1120 moving along optical axis 1a from the front of light source lamp unit 8 toward the back is thus formed. The area around such heat emissions sources as lamp 805 and reflector 806 is thus efficiently cooled.

3. Cooling the optical lens unit

The cooling mechanism of the optical elements inside optical lens unit 9 is described with reference primarily to FIG. 9 and FIG. 10. Optical lens unit 9 is enclosed by top light guide 901 and bottom light guide 902. More specifically, top light guide 901 comprises a flat top panel shown in FIG. 3A, and side wall tops extending substantially vertically down from around the edges of this top panel. Bottom light guide 902 likewise comprises a bottom panel and side wall bottoms rising substantially vertically from around the edges of this bottom panel. These light guides 901 and 902 overlap vertically. As described above, the part of top light guide 901 above prism unit 910 is notched out.

Top seal plate 991 is installed above top light guide 901. This top seal plate 991 in effect creates an airtight seal around the top of optical lens unit 9. In addition, an air passage through which air current 1130 flows to power supply unit 7 is formed as described above. This air passage is formed in the part of top light guide 901 directly above uniform illumination optics system 923.

Below optical lens unit 9 a bottom seal plate 1150 is likewise disposed below bottom light guide 902. This bottom seal plate 1150 is mounted in a manner enclosing from below the circulation fan 15B mounted to the part of bottom light guide 902 directly below prism unit 910. In the present embodiment, therefore, the bottom of optical lens unit 9 is sealed in a substantially airtight state.

The front parts of these top and bottom seal plates are fastened to head panel 903. The backs of these panels are fastened respectively to the top and bottom of top light guide 901 and bottom light guide 902.

On both sides of projection lens unit 6 mounted to the front center of head panel 903, substantially airtight air circulation paths 1160 and 1170 oriented vertically along the inside surface of front case 5 are formed between seal plates 1161 and 1171 and the inside surface of front case 5. Radiators 5R and 5L are formed in the part of front case 5 at which these circulation paths 1160 and 1170 are positioned. Plural ventilation holes 9031 and 9032 are also formed in head panel 903 connecting the internal space of optical lens unit 9 and the tops of air circulation paths 1160 and 1170.

The internal space of optical lens unit 9 is thus divided in a substantially airtight state. More specifically, said optical lens unit 9 is made substantially airtight by means of top light guide 901 and bottom light guide 902 enclosing the outside of optical lens unit 9, top seal plate 991 disposed above top light guide 901, bottom seal plate 992 disposed below bottom light guide 902, and head panel 903.

When circulation fan 15B positioned below the airtight space divided by these members is driven, an air circulation current 1180 is formed as shown in FIG. 9 and FIG. 10 moving upward over the front and back surfaces of each light valve, then through circulation paths 1160 and 1170, and back again to the intake side of fan 15B. When this air circulation current 1180 rises, it cools the light valves, polarizing plate, and other optical elements. The current rises and then flows horizontally over top seal plate 991.

Directly above top seal plate 991 is disposed intake fan 15A from which outside air is introduced and blown across the top surface of top seal plate 991. Therefore, while air circulation current 1180 flowing horizontally along the bottom of top seal plate 991 flows along the top seal plate, heat exchange with the air current introduced from the outside and flowing along the top of top seal plate 991 occurs through this top seal plate 991, and cooling occurs.

As the air flows downward through circulation paths 1160 and 1170, heat is dissipated to the outside through radiators 5R and 5L formed on front case 5. The circulating air current is therefore efficiently cooled sufficiently. As a result, cooling the inside of the optical lens unit is efficiently accomplished.

To cool the inside of optical lens unit 9, an internal circulation current is created in the present embodiment as thus described, and cooling is accomplished by means of this internal circulation current without introducing air from the outside. When an air current is introduced from outside for cooling, dust, etc., from outside penetrates the optical lens unit 9, adheres to the surface of the optical elements, and this may cause blurring and other deterioration of the projection image. Because cooling is accomplished by means of a circulation current in the present embodiment, however, such harm does not occur. In other words, a cooling mechanism having a dustproof structure appropriate to cooling the optical lens unit can be achieved in a projection display apparatus according to the present embodiment.

Furthermore, by using integrator lenses, light conductance to the aperture part of the light valves is uniform at the center and periphery, the amount of light in the center is reduced to $1/3$ to $1/5$, and even more efficient cooling can be accomplished when used in combination with this cooling method. In addition, by polarizing and unifying the direction of wave vibrations by means of a polarized light conversion element, the heat generated from the polarizing plates can be halved, and dustproof cooling can be realized.

It should be noted that in the present embodiment intake opening 23 is opened directly above top seal plate 991, i.e., in top panel 3a of the outside case of the apparatus, and outside air is blown over top seal plate 991 to cool air circulation current 1180 through here. It is alternatively possible to form the intake opening on the side of bottom seal plate 1150, i.e., in the bottom plate, to cool air circulation current 1180 through bottom seal plate 1150. Moreover, it is also possible to cool the internal air circulation current 1180 by passing the outside air over part of the light guide defining the outside circumference surface of the optical lens unit.

Furthermore, in place of forming circulation paths 1160 and 1170 in which radiators 5R and 5L are formed between head panel 903 and front case 5, [air circulation paths 1160 and 1170] may be formed between the right and left sides of optical lens unit 9 and the corresponding side walls 3b and 3c of the outside case, and the radiator may be disposed to the outside case wall of these.

Alternative Embodiment of the Cooling Mechanism of the Optical Lens Unit

Figure 12:
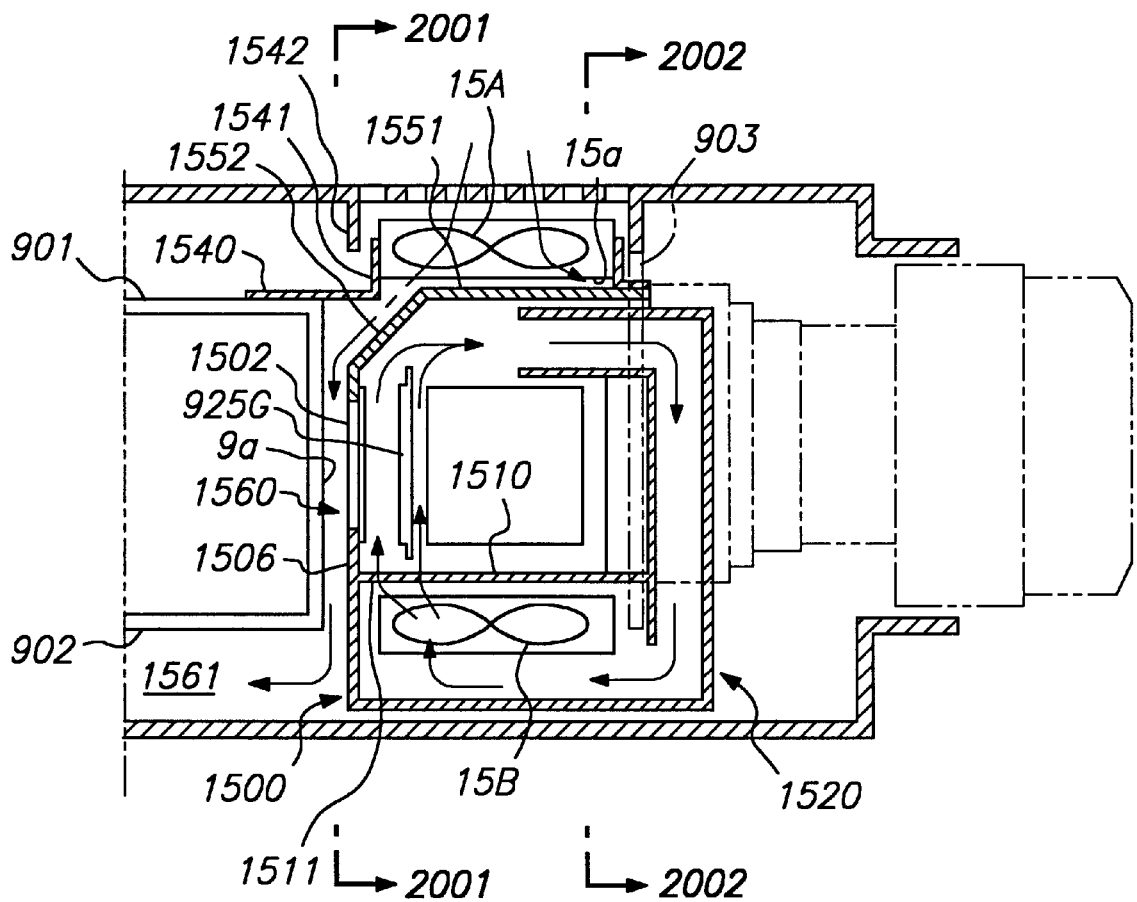
FIG. 12 is a simple configuration diagram showing a cross section of a cooling mechanism using a dustproof box.

FIG. 11 to FIG. 14 show a second alternative embodiment of the cooling mechanism of optical lens unit 9. Note that only those parts that differ are described below. Identical parts are described using the numbers assigned to those parts in FIG. 1 to FIG. 10.

The cooling mechanism shown in these figures can efficiently cool each of the light valves 925R, 925G, and 925B that are the sources of heat in optical lens unit 9, and the parts of polarizing plates 981, 982, and 983.

As a result, of the optical elements constituting optical lens unit 9, prism unit 910, each of the light valves 925R, 925G, and 925B opposite the three incidence planes of prism unit 910, and each of the polarizing plates 981, 982, and 983 are effectively housed in an airtight box. In addition, circulation fan 15B is disposed inside this airtight box to create a circulating air current for cooling inside the box.

Described in more detail, prism unit 910, each of the light valves 925R, 925G, and 925B opposite the three incidence planes of prism unit 910, and each of the polarizing plates 981, 982, and 983 are enclosed by a dustproof box 1500 having a rectangular parallelopiped shape of a size sufficient to enclose these optical elements, and the vertical wall members of head panel 903. This dustproof box 1500 extends vertically through the horizontal wall part of head panel 903. Square openings 1501, 1502, and 1503 are provided in the three side walls of dustproof box 1500 to which light is incident. Each of these openings 1501 to 1503 is closed in an airtight state by means of the polarizing plates 981 to 983 fastened to the side wall from the inside thereof. The side of dustproof box 1500 from which light is emitted is open, this part is mounted to the vertical wall part of head panel 903, and a storage space with an overall rectangular parallelopiped shape is thus formed.

Inside dustproof box 1500 at a position near the bottom thereof is formed a horizontal divider 1510. Prism unit 910 is supported above this divider 1510. Circulation fan 15B is disposed in the space below this divider 1510. The air outlet side of this circulation fan 15B faces the side of divider 1510. Three openings 1511 (only two openings are shown in the figure) for air flow are formed directly below each of the each of the light valves 925R, 925G, and 925B in divider 1510.

Air return ducts 1520 and 1530 are connected in front on the right and left sides of dustproof box 1500. These air return ducts 1520 and 1530 are for returning to the air intake side of circulation fan 15B the air current blown from circulation fan 15B above prism unit 910.

These air return ducts 1520 and 1530 are symmetrical side to side. The structure of one duct 1520 is described. A top horizontal duct member 1521 connected to the top of side wall 1505 of dustproof box 1500 is disposed above this air return duct 1520. This top horizontal duct member 1521 extends horizontally sideways to the apparatus from side wall 1505 with the front edge extending horizontally toward the front of the apparatus passed the vertical wall part of head panel 903 to the front of the apparatus. Vertical duct member 1522 extending vertically downward toward the bottom of the apparatus is connected to the front of top horizontal duct member 1521. A bottom horizontal duct member 1523 is also connected to the bottom of vertical duct member 1522. Bottom horizontal duct member 1523 extends horizontally below head panel 903 toward the front of the apparatus, and is connected to a part of dustproof box 1500 in which circulation fan 15B is built in.

Air return duct 1530 on the other side is identically structured, and comprises top horizontal duct member 1531, vertical duct member 1532, and bottom horizontal duct member 1533.

Intake fan 15A is positioned directly above dustproof box 1500 thus constructed. This intake fan 15A is supported by support panel 1540 mounted to the top of dustproof box 1500 and the top of top light guide 901. A cylindrical duct 1541 surrounding the circumference of air outlet 15a of intake fan 15A is formed on this support panel 1540. A cylindrical duct 1542 enclosing this duct 1541 is formed integrally to the back of the upper case. In addition, intake fan 15A is positioned so that air outlet 15a is separated from the top of dustproof box 1500 by, for example, approximately 5 mm. It should be noted that intake fan 15A may be mounted and fastened to the upper case.

Top surface 1550 of dustproof box 1500 comprises square flat surface 1551, inclined surface 1552 formed to the back of the apparatus [from flat surface 1551], and inclined surfaces 1553 and 1554 formed on the left and right sides of flat surface 1551. These inclined surfaces 1552, 1553, and 1554 slope downward at an inclination angle between approximately 40 degrees and 60 degrees.

Next, a gap 1560 of, for example, approximately 5 mm is formed between side 1506 of dustproof box 1500 on the back side of the apparatus and front 9a of optical lens unit 9 formed by top and bottom light guides 901 and 902 opposite side 1506. The top of this gap 1560 is continuous to the air outlet side of intake fan 15A. The bottom of gap 1560 is continuous to the gap 1561 between bottom light guide 902 of optical lens unit 9 and the lower case.

Note that a metallic tape is applied at the connections between, for example, dustproof box 1500 and air return ducts 1520 and 1530 as a sealant. This further improves the airtightness of dustproof box 1500. Note that a method using a cushioning material to retain airtightness may also be used.

The cooling mechanism of this construction has a dustproof box 1500 below which circulation fan 15B is positioned. Therefore, when circulation fan 15B is driven, the air forced from air outlet 15b passes opening 1511 of divider 1510 and rises to prism unit 910. It then passes through and flows upward from the gaps between prism unit 910 and each of the light valves 925R, 925G, and 925B, and the gaps between each of the light valves 925R, 925G, and 925B and the corresponding polarizing plates 981, 982, and 983. Thereafter the air passes the pair of air return ducts 1520 and 1530, circulates, and returns to the air intake side of circulation fan 15B. As a result, a air circulation current is formed inside the substantially airtight dustproof box 1500. In FIG. 11 to FIG. 14 the air flow path of the circulating air current is shown by the arrows.

The heat-emitting light valves and polarizing plates are thus cooling by this circulating air current. As a result, penetration and adhering of dust from the outside to the surfaces of the light valves, prism unit, etc., does not occur because air introduced from the outside is not used.

In addition, polarizing plates 981, 982, and 983 are mounted to openings in side walls 1505, 1506, and 1507 of dustproof box 1500, and function also to close these openings. Furthermore, air introduced from intake fan 15A flows over the surfaces of the side walls of dustproof box 1500. Each of these side walls therefore functions as radiator panels for polarizing plates 981, 982, and 983. Each of the polarizing plates is therefore efficiently cooled.

Moreover, the circulating air current formed by circulation fan 15B passes through air return ducts 1520 and 1530 and returns to circulation fan 15B. The circulating air current is cooled as it passes through these air return ducts 1520 and 1530. More specifically, the outside surfaces of each of the air return ducts 1520 and 1530 functions as a heat dissipation surface, and the circulating air current is efficiently cooled.

Moreover, cylindrical ducts 1541 and 1542 are disposed around intake fan 15A. Therefore, the introduced outside air is forced upward toward the top of dustproof box 1500 without being dispersed. As a result, cooling dustproof box 1500 can also be efficiently accomplished.

It should be noted that cooling efficiency can be further improved if a Peltier element or other electrical cooling means is disposed inside the top surface of the dustproof box in addition to the cooling means described above.

Applications in Industry

As described above according to the present invention, an airtight space is effectively formed inside all or part of the optical lens unit, a circulating air current is created therein using a circulation fan, and the liquid crystal light valves and other heat-emitting components are cooled by this circulating air current.

Therefore, unlike conventional methods whereby outside air is introduced into the optical lens unit for cooling, there is no penetration of dust, oily smoke, etc. from the outside. As a result, the inside of the optical lens unit can be efficiently cooled without dust, etc., adhering to the surface of the optical elements and the image quality of the projection-enlarged image deteriorating.

In particular, when the apparatus is constructed to achieve heat exchange between the circulating air current and the outside air introduced inside the apparatus, the circulating air current can be efficiently cooled sufficiently. Likewise, the circulating air current can be efficiently cooled sufficiently even when the circulating air current is circulated through an air path comprising a heat radiator exposed directly to the outside. Therefore, if these constructions are used, an even more efficient cooling action can be realized.

Furthermore, integrator lenses are used in the optical system of the present invention. If integrator lenses are used, the amount of light conducted to the center of the liquid crystal light valves is suppressed to between ⅓ to ⅕, and the amount of light guided to the center and surrounding areas can be made uniform. Therefore, if integrator lenses are used in conjunction with the cooling method of the present invention, cooling the liquid crystal light valves can be accomplished with particular efficiency.

Moreover, if a polarized light conversion means for polarizing the wavelength components (P waves and S waves) of the illumination lighting in one direction is also used, the load on the polarizing plates mounted to the dustproof box can be halved, and dependence on the introduced outside air can be reduced.

Furthermore, the dustproof box more easily transfers heat emitted from the polarizing plates and effectively functions as a heat radiator with a wide area where the heat gradient is high, can greatly improve the heat exchange with the circulating air current inside the dustproof box, and can assure a sufficient cooling capacity without considering such complex structures as liquid-cooled designs. Note also that if a Peltier element or other electrical cooling means is used, even higher luminance can be achieved and intake fan 15A can be eliminated, contributing to a low profile product design.

I claim:

1. An optical lens unit for optically processing a light beam emitted from a light source into an optical image, the optical lens unit defining a substantially sealed chamber therein and comprising:

a plurality of optical components disposed within the sealed chamber to receive and optically modulate the light beam; and a fan disposed within the sealed chamber distally from the light beam to circulate air within the sealed chamber and cool said optical components;

wherein said plurality of optical components includes a light valve for receiving and optically modulating at least a portion of the light beam;

wherein said fan circulates the air within the sealed chamber across said light valve in a substantially vertical manner;

wherein the sealed chamber includes disparate first and second chambers separated by a divider having spatially-separated circulating air intake and outlet ports communicating with each chamber, said light valve positioned within said first chamber and said fan positioned within said second chamber; and wherein said fan circulates the air between the first and second chambers through the air intake and outlet ports.

2. The optical lens unit of claim 1, wherein said fan is disposed within the second chamber beneath said light valve to force air within the second chamber upwardly through the air outlet port towards said light valve.

3. The optical lens unit of claim 1, further comprising plural radiators in thermal communication with said sealed chamber to dissipate and draw away heat energy therein.

4. The optical lens unit of claim 1, further comprising an integrator lens.

5. The optical lens unit of claim 1, further comprising a polarized light converter to align a polarization direction of the light beam.

6. A projection display apparatus, comprising:

an exterior case;

a light source housed within said exterior case;

an optical lens unit internally supported within said exterior case for optically processing a light beam emitted from the light source into an optical image, said optical lens unit defining a substantially sealed chamber therein and comprising:

a plurality of optical components disposed within the sealed chamber to receive and optically modulate the light beam; and a fan disposed within the sealed chamber distally from the light beam to circulate air within the sealed chamber and cool said optical components; and a projection lens unit to project the optical image externally therefrom;

wherein said plurality of optical components includes a light valve for receiving and optically modulating at least a portion of the light beam;

wherein said fan circulates the air within the sealed chamber across said light valve in a substantially vertical manner;

wherein the sealed chamber includes disparate first and second chambers separated by a divider having spatially-separated circulating air intake and outlet ports communicating with each chamber, said light valve positioned within said first chamber and said fan positioned within said second chamber; and wherein said fan circulates the air between the first and second chambers through the air intake and outlet ports.

7. The apparatus of claim 6, wherein said fan is disposed within the second chamber beneath said light valve to force air within the second chamber upwardly through the air outlet port towards said light valve.

8. The apparatus of claim 6, wherein said optical lens unit further comprises plural radiators disposed on an external surface thereof, said radiators in thermal communication with said sealed chamber to dissipate and draw away heat energy contained therein towards said external surface.

9. The apparatus of claim 6, wherein said optical lens unit includes an external surface isolating the sealed chamber in a substantially airtight manner; and wherein the apparatus further comprises:
  air induction means communicating with said exterior case for introducing ambient air within the apparatus; and
  air intake path means communicating with said air induction means for channeling the ambient air to flow across at least a portion of said external surface of said optical lens unit to promote heat exchange between the circulating air within the sealed chamber and the ambient air.

10. The apparatus of claim 6, wherein said optical lens unit further comprises:
  an external surface thermally communicating with said exterior case, said external surface isolating the sealed chamber in a substantially airtight manner; and
  an air path formed in the sealed chamber to channel the circulating air within the sealed chamber and to promote heat exchange between the circulating air within the sealed chamber and ambient air external to said exterior case.

11. The apparatus of claim 10, wherein said optical lens unit further comprises plural radiators disposed on said external surface proximate said air path of the sealed chamber to direct heat energy from the sealed chamber to the ambient air.

12. An optical lens unit for optically processing a light beam emitted from a light source into an optical image, comprising:
  a substantially sealed chamber within which three light valves and a prism having incident planes are disposed, each of the light valves being positioned opposite a different one of the incident planes of the prism;
  a fan disposed within said sealed chamber distally from the light beam to circulate air within said sealed chamber and cool said prism and light valves; and
  an air path within said sealed chamber through which the air circulated by said fan flows and returns to an air intake side of said fan.

13. The optical lens unit of claim 12, wherein said sealed chamber comprises at least one polarizing plate to externally receive the respective light beam portions.

14. The optical lens unit of claim 13, wherein said fan circulates the air within the sealed chamber across said light valves, prism, and an interior surface of the polarizing plate.

15. A projection display apparatus, comprising:
  an exterior case;
  a light source housed within said exterior case;
  an optical lens unit including a prism having incident planes, and three light valves each positioned opposite a different one of the incident planes of the prism;
  a sealed chamber within which said prism and light valves are disposed;
  a fan disposed within the sealed chamber distally from the light beam to circulate air within said sealed chamber and cool said prism and light valves; and
  an air path within said sealed chamber through which the air circulated by said fan flows and returns to an air intake side of said fan.

16. The apparatus of claim 15, wherein said sealed chamber comprises at least one polarizing plate disposed on an external surface thereof to receive the light beam portions.

17. The apparatus of claim 16, wherein said fan circulates the air within the sealed chamber across said light valves, prism, and an interior surface of the polarizing plate.

18. The apparatus of claim 15, further comprising:
  air induction means communicating with said exterior case for introducing ambient air within the apparatus; and
  air intake path means communicating with said air induction means and said external surface of said sealed chamber for channeling the ambient air to flow across at least a portion of said external surface to promote heat exchange between the circulating air within the sealed chamber and the ambient air.

19. The apparatus of claim 6, further comprising an integrator lens.

20. The apparatus of claim 6, further comprising a polarized light converter to align the polarization direction of the light beam.

* * * * *